7843X
I. M. G. TRUMAN.
Lamp.
Patented Nov. 19, 1833.
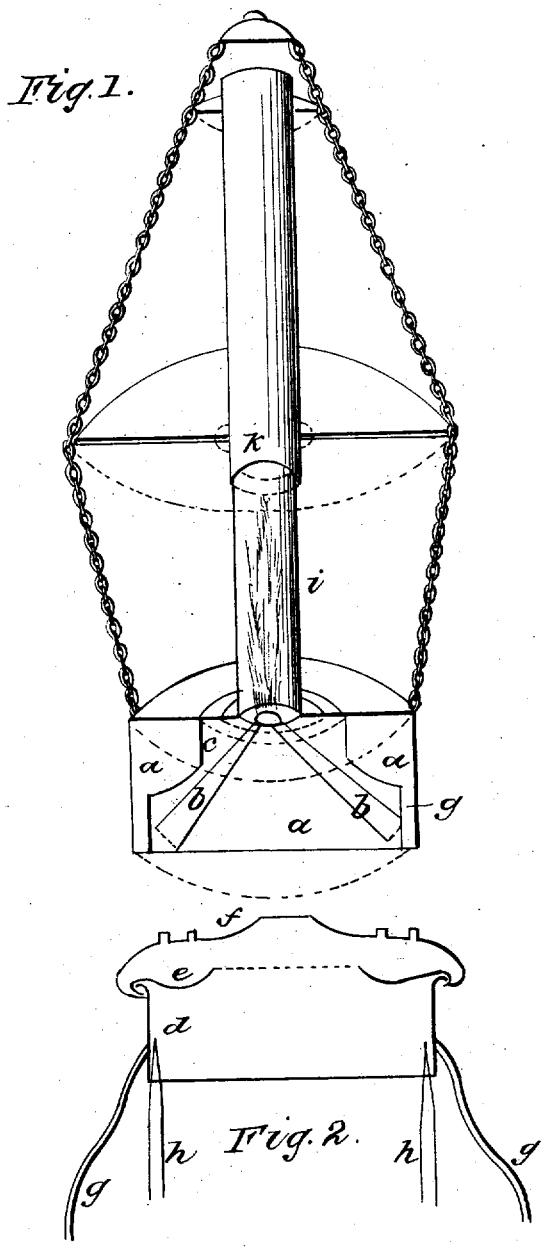
N. PETERS, Photo-Lithographer, Washington, D. C.

7843X Nov 19 1833

Joseph M. Truman & George Truman Penn Township Penn.

Letters Patent

The schedule referred to in these Letters Patent and making part of the same containing a description in the words of the said Joseph M. Truman and George Truman themselves of their improvement in Lamps called an oil or Spirit gas Lamp.

To all whom it may concern Be it known that We Joseph M. Truman and George Truman of Penn Township in the County of Philadelphia have invented an improved Lamp for the burning of oil Tallow Spirits or any of the combustible solid, semifluid or fluid compounds usually burnt which Lamp as constructed by us we denominate the oil or Spirit gas Lamp and intend to employ it for illuminating Streets Stores Public buildings Halls or other places where artificial light may be required and we do hereby declare that the following is a full and exact description thereof reference being had to the drawings which accompany and make a part of this Specification — We call our Lamp a Gas Lamp because there is a part of it which we denominate the retort or Gas generator in which the vapour arising from the burning wick or wicks is so far decomposed as to prepare it for the immediate and perfect combustion on its mixture with a due proportion of atmospheric air in a way to be presently described — Fig 1 in the accompanying drawings is a vertical section somewhat in perspective of the whole apparatus in one of its forms showing a Lamp which may be suspended in a Store or elsewhere a a is the cup or reservoir which is to contain the oil or other material it has a bottom and sides like the common Street Lamp b b are two or any other number of tubes or burners for containing wicks these are soldered to the bottom of the Lamp by their lower edges whilst they incline towards each other at their upper ends so as to bring their flames when ignited into contact with each other or-

78437 nearly so. — C is the part called by us the retort or Generator.
In Fig 2. a section of this is seen of the full size sometimes
used by us. d. is a rim of brass or other metal which may
be about three fourths of an inch wide. e.f. are two concave
pieces of metal with their concave sides turned towards
each other thus leaving a chamber or space between them. they
are both edged, or otherwise joined to the rim d. — The upper
plate f. has a round or other shaped orifice in its centre generally
of from three eighths to half an inch in diameter — its inner edge being
turned up as shewn in the sketch. Sometimes instead of one we make
several orifices, their number and form admitting of considerable
variation whilst their capacity or area is a point of considerable impor-
-tance. In the lower plate e. a single orifice is made which may be
an inch or more in diameter or of such size as will take in the wick
or wicks at the upper end of the tube or burners. Although we prefer
to make the retort in the manner described or nearly so we do not con-
-fine ourselves thereto but vary this also in different ways. Sometimes
we use a single plate f. omitting the plate e. Fig 2 in which case
it may be flat or convex, instead of concave still having the hole or
holes in the centre — As the lower edge of the rim d. is not intended
to come into contact with the oil or other material in the reservoir of
the Lamp, the air of the atmosphere is freely admitted under
it so as to mix with the Gas, formed in the retort or generator and
effect its combustion but the rim, d, may be perforated with holes
entirely surrounding it below the edging of the plates. g.g. rep
-resent legs sometimes used to support the retort or generator
within the reservoir. Where tallow or other hard semi fluid sub-
-stance is employed these legs should be made of stout copper to
serve as heaters that being the best conductor among the cheaper
metals — Instead of these legs we commonly use spring pieces
h.h. or wires to pass into sockets rising from the inside of the reservoir
or employ other convenient means of supporting the retort. It is well
however to be able to raise or lower it for reasons which will presently appear and thus the spring and socket readily allow. The flame
which is to ascend through the orifice in the plate f is to be surroun
-ded by a glass chimney i such as is ordinarily used with lamps
but this is to be surmounted by a metallic or other tube or chim
-ney k k into the lower end of which the glass chimney passes. This
additional tube we denominate an illuminator and its em
-ployment is of peculiar importance in the Lamp which we have
described. For Lamps of the ordinary size the length of the illu
-minator should be from twelve to sixteen inches and of about two
inches in diameter varying of course with the size of the Lamp
and the consequent enlargement or diminution of the flame
When this Lamp is to be used the wicks are to be lighted and should
be so drawn up as to burn with a full large flame. the retort or gen
-erator is then brought down thereon say to a distance of from one half
to one fourth of an inch from the wick, when a flickering blue flame
will ascend through the orifice or orifices of the upper plate when
more than one plate is employed, the light from which will be
very feeble and without smoke. The glass chimney is then to be pla
-ced over the flame resting on the generator between small projecting
rims this will produce a strong yellow flame rising to the top
of the chimney with much smoke. The illuminator is then added
which produces a clear brilliant stream of white flame ascending
to the height of from four to six inches and without any smoke what
-ever. We have thus fully described the general construction of and
the manner of using our Lamp and have indicated some of the nu
-merous changes which may be made in it in mere matters of ar
-rangement whilst the principle of its construction and action will
remain the same.

What we claim as our invention is the employment
of that part which we denominate the retort used in the way herein de
-scribed and consisting of one or more plates to be let down upon the flame
and we also claim the lengthening out of the glass chimney by means of the
illuminator without which the combustion will not be rendered

182. 7843X effective — It will be seen that although this illuminator may bear some resemblance to a chimney or tube for carrying off smoke which is in common use yet in our Lamp it is applied to effect and [illegible] quite another and a very different object namely the entire destruction of the smoke by the perfect combustion of the carbonaceous matter of the gas. We claim this therefore not alone as a tube or chimney but in combina-tion with the generator and glass chimney for the purpose hereinbefore set forth in a Lamp of our construction Witnesses
M. McMichael
Wm. C. Master J. M. Trimmer
George Trimmer End.
[illegible]

[illegible] Portfolio 7339 [illegible]